United States Patent [19]

Srol

[11] Patent Number: 5,183,407
[45] Date of Patent: Feb. 2, 1993

[54] REUSABLE SAFETY CAP FOR BOOSTER CABLE

[76] Inventor: Karl Srol, R.R. 1, Gunn, Alberta, Canada, T0E 1A0

[21] Appl. No.: 788,023

[22] Filed: Nov. 5, 1991

[30] Foreign Application Priority Data

May 6, 1991 [CA] Canada .................................. 2041844

[51] Int. Cl.⁵ ............................................. H01R 13/44
[52] U.S. Cl. .................................... 439/135; 439/521; 439/892
[58] Field of Search ............... 439/135, 148, 521, 754, 439/759, 892, 366, 367, 371

[56] References Cited

U.S. PATENT DOCUMENTS

| | | | |
|---|---|---|---|
| 1,965,151 | 7/1934 | Mueller | 439/892 |
| 3,258,731 | 6/1966 | Still et al. | 439/135 |
| 4,483,910 | 11/1984 | Julian | 439/521 |
| 4,740,169 | 4/1988 | Gordon | 439/521 |

Primary Examiner—Paula A. Bradley

[57] ABSTRACT

A reusable safety cap for exposed unprotected booster cable clamps having spring actuated clamping jaws consisting of a cap shell with an internal gripping tab. When the clamp is inserted into the cap shell the internal gripping tab is gripped by the spring actuated clamping jaws to maintain the clamp within the cap shell.

2 Claims, 1 Drawing Sheet

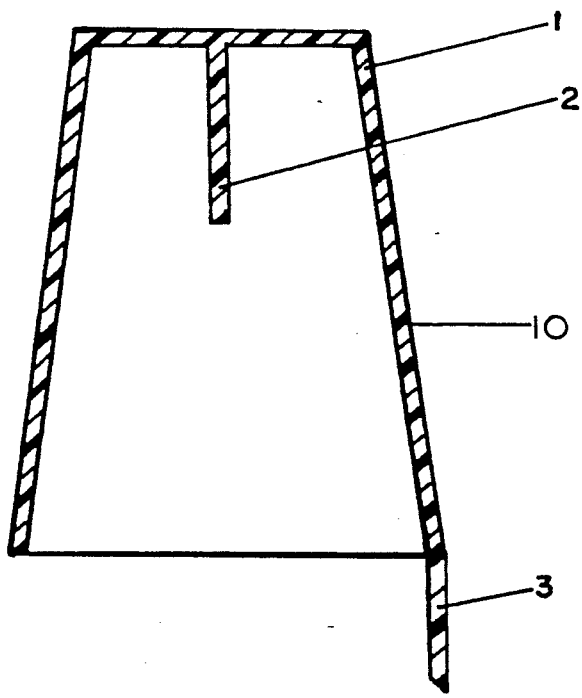
FIG. 1
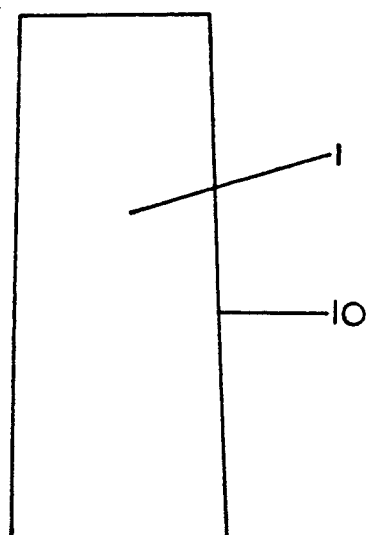
FIG. 2
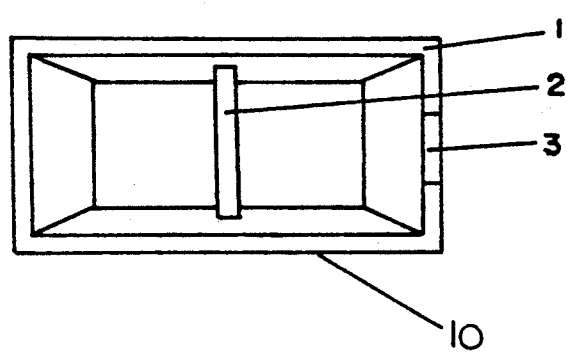
FIG. 3
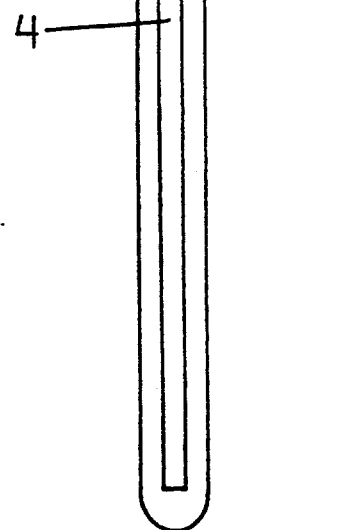

REUSABLE SAFETY CAP FOR BOOSTER CABLE

The present invention relates to a safety cap for booster cable clamps.

BACKGROUND OF THE INVENTION

Booster cable clamps have spring actuated metal clamping jaws which are used to connect the booster cables to terminals on a battery Once one of the clamping jaws is attached to a battery, the other of the clamping jaws contains live electric current which presents a potential hazard.

SUMMARY OF THE INVENTION

What is required is a safety cap of a non-conductive material which is adapted for use with booster cable clamps having spring actuated clamping jaws.

According to the present invention there is provided a reusable safety cap for exposed unprotected booster cable clamps having spring actuated clamping jaws, which is comprised of a cap shell with an internal gripping tab. When the clamp is inserted into the cap shell the internal gripping tab is gripped by the spring actuated clamping jaws to maintain the clamp within the cap shell.

BRIEF DESCRIPTION OF THE DRAWINGS

These and other features of the invention will become more apparent from the following description in which reference is made to the appended drawings, wherein:

FIG. 1 is a section view of a safety cap constructed in accordance with the teachings of the present invention.

FIG. 2 is a side view of the safety cap illustrated in FIG. 1.

FIG. 3 is a bottom plan view of the safety cap illustrated in FIG. 1.

DETAILED DESCRIPTION OF THE PREFERRED EMBODIMENT

The preferred embodiment, a safety cap for booster cable clamps generally identified by reference numeral 10, will now be described with reference to FIGS. 1 through 3.

Safety cap 10 is a reusable safety cap for use with exposed unprotected booster cable clamps (not shown). These booster cable clamps have spring actuated clamping jaws. Referring to FIGS. 1 and 3, safety cap 10 consists of a cap shell 1 with an internal gripping tab 2. Referring to FIG. 2, a tying strip 3 is attached to cap shell 1. Tying strip 3 has an elongate opening 4.

The use and operation of safety cap 10 will now be described with reference to FIGS. 1 through 3. When the booster cable clamp is inserted into cap shell 1, internal gripping tab 2 is gripped by the spring actuated clamping jaws to maintain the clamp within cap shell 1. Tying strip 3 enables cap shell 1 to be secured to the booster cable to prevent a loss or misplacement of cap shell 1 when the booster cable is in use. This is accomplished by wrapping tying strip 3 around the booster cable and then extending cap shell 1 through elongate opening 4 in tying strip 3.

It will be apparent to one skilled in the art that modifications may be made to the preferred embodiment without departing from the spirit and scope of the invention as defined by the claims.

The embodiments of the invention in which an exclusive property or privilege is claimed are defined as follows:

1. A reusable safety cap for exposed unprotected booster cable clamps having spring actuated clamping jaws, comprising:
    a cap shell with an internal gripping tab such that when the clamp is inserted into the cap shell the internal gripping tab is gripped by the spring actuated clamping jaws to maintain the clamp within the cap shell.

2. A reusable safety cap as defined in claim 1, having a tying strip attached to the cap shell, whereby the cap shell is secured to the booster cable to prevent a loss or misplacement of the cap shell when the booster cable is in use.

* * * * *